(12) United States Patent
Robertson

(10) Patent No.: US 11,845,540 B2
(45) Date of Patent: Dec. 19, 2023

(54) APPARATUS AND METHOD FOR DETERMINING AIRCRAFT TIRE PRESSURE

(71) Applicant: AIRBUS OPERATIONS LIMITED, Bristol (GB)

(72) Inventor: Michael Robertson, Bristol (GB)

(73) Assignee: Airbus Operations Limited, Bristol (GB)

(*) Notice: Subject to any disclaimer, the term of this patent is extended or adjusted under 35 U.S.C. 154(b) by 234 days.

(21) Appl. No.: 17/505,731

(22) Filed: Oct. 20, 2021

(65) Prior Publication Data
US 2022/0185459 A1 Jun. 16, 2022

(30) Foreign Application Priority Data
Dec. 10, 2020 (GB) ..................... 2019447

(51) Int. Cl.
*B60C 23/00* (2006.01)
*B60C 23/04* (2006.01)
(Continued)

(52) U.S. Cl.
CPC ........ *B64C 25/36* (2013.01); *B60C 23/00318* (2020.05); *B60C 23/0474* (2013.01);
(Continued)

(58) Field of Classification Search
CPC ............ B60C 2200/02; B60C 23/0408; B60C 23/0479; B60C 23/043; B60C 23/04; B60C 23/0474; B60C 23/0486; B60C 23/20; B60C 23/0488; B60C 23/0476; B60C 23/0433; B60C 23/0496; B60C 23/00; B60C 23/0498; B60C 23/0413; B60C 23/0416; B60C 23/0427; B60C 23/0428; B60C 23/0471; B60C 23/0493; B60C 23/0454; B60C 23/02; B60C 23/0481; B60C 23/0444; B60C 23/0422;
(Continued)

(56) References Cited

U.S. PATENT DOCUMENTS 7,225,666 B2 * 6/2007 Welch .................... B60C 23/00
73/146
8,599,044 B2 12/2013 Maggiore et al.
(Continued)

FOREIGN PATENT DOCUMENTS

EP 1 740 399 1/2007
EP 3 069 904 9/2016
(Continued)

OTHER PUBLICATIONS

European Search Report cited in EP 21203401.1 dated Mar. 25, 2022, 13 pages.
(Continued)

*Primary Examiner* — Andre J Allen
(74) *Attorney, Agent, or Firm* — Nixon & Vanderhye P.C.

(57) ABSTRACT

An apparatus for determining tire pressure of an aircraft tire. The apparatus includes a processing system configured to: obtain a first set and a second set of tire measurement data for an aircraft, wherein the first set is from a start of a flight cycle and the second set is from a time before the first set; and determine a steady state tire pressure based on the first and second sets of measurement data.

17 Claims, 3 Drawing Sheets

(51) Int. Cl.
*B60C 23/20* (2006.01)
*G01L 17/00* (2006.01)
*G01K 13/00* (2021.01)
*B64C 25/36* (2006.01)

(52) U.S. Cl.
CPC .............. *B60C 23/20* (2013.01); *G01K 13/00* (2013.01); *G01L 17/00* (2013.01); *B60C 2200/02* (2013.01)

(58) Field of Classification Search
CPC .............. B60C 23/041; B60C 23/0459; B60C 23/0461; B60C 1/0016; B60C 23/0406; B60C 23/0447; B60C 23/0477; B60C 23/0405; B60C 23/0484; B60C 23/00354; B60C 23/0411; B60C 23/0483; B60C 19/00; B60C 23/0457; B60C 23/0425; B60C 23/0452; B60C 23/0494; B60C 15/0018; B60C 23/00363; B60C 23/045; B60C 23/0401; B60C 23/10; B60C 23/002; B60C 23/00318; B60C 23/0472; B60C 23/0455; B60C 15/06; B60C 23/001; B60C 23/009; B60C 23/0442; B60C 23/004; B60C 23/0415; B60C 23/042; B60C 23/0467; B60C 23/06; B60C 23/0403; B60C 23/061; B60C 15/05; B60C 23/0469; B60C 23/064; B60C 9/023; B60C 11/246; B60C 15/04; B60C 23/00336; B60C 29/068; B60C 9/22; B60C 15/024; B60C 2019/004; B60C 23/00345; B60C 23/066; B60C 23/127; B60C 9/18; B60C 11/1612; B60C 15/0009; B60C 29/06; B60C 9/20; B60C 11/1606; B60C 23/04985; B60C 29/02; B60C 9/0042; B60C 1/00; B60C 11/00; B60C 15/0072; B60C 2009/1871; B60C 23/0491; B60C 3/00; B60C 9/263; B60C 9/28; B60C 13/001; B60C 23/0437; B60C 23/0462; B60C 11/0058; B60C 11/16; B60C 17/06; B60C 19/122; B60C 2009/0092; B60C 2015/0614; B60C 220/04; B60C 23/003; B60C 23/00372; B60C 23/006; B60C 23/007; B60C 23/0432; B60C 23/0489; B60C 5/08; B60C 9/08; B60C 11/0008; B60C 11/04; B60C 15/0206; B60C 15/0632; B60C 17/01; B60C 2009/0466; B60C 2011/0016; B60C 2015/0657; B60C 2015/0678; B60C 23/0445; B60C 23/0449; B60C 23/137; B60C 23/19; B60C 29/062; B60C 5/20; B60C 11/005; B60C 11/0083; B60C 11/0306; B60C 11/243; B60C 17/02; B60C 2011/0341; B60C 2011/0355; B60C 2019/006; B60C 23/0438; B60C 23/044; B60C 23/16; B60C 29/00; B60C 3/04; B60C 5/02; B60C 5/22; B60C 9/00; B60C 9/0007; B60C 9/2009; B60C 1/0025; B60C 11/01; B60C 11/02; B60C 11/032; B60C 11/0332; B60C 11/1346; B60C 11/24; B60C 13/002; B60C 15/00; B60C 15/0203; B60C 15/0607; B60C 17/04; B60C 19/003; B60C 2001/0066; B60C 2011/0381; B60C 2200/08; B60C 2200/12; B60C 23/005; B60C 23/008; B60C 23/0423; B60C 23/0464; B60C 23/18; B60C 25/132; B60C 29/064; B60C 5/008; B60C 5/04; B60C 7/10; B60C 9/0292; B60C 9/06; B60C 9/1807; B60C 9/2204; B60C 1/0041; B60C 11/0066; B60C 11/14; B60C 13/00; B60C 15/0603; B60C 17/00; B60C 17/066; B60C 17/103; B60C 19/08; B60C 2001/0083; B60C 2009/0085; B60C 2009/0276; B60C 2009/0425; B60C 2009/0441; B60C 2009/045; B60C 2009/0458; B60C 2009/0475; B60C 2011/0025; B60C 2015/009; B60C 2015/061; B60C 2015/0621; B60C 2015/0625; B60C 2019/005; B60C 2019/008; B60C 2200/06; B60C 2200/065; B60C 2200/14; B60C 23/00305; B60C 23/062; B60C 23/08; B60C 23/131; B60C 3/08; B60C 5/00; B60C 5/10; B60C 5/24; B60C 7/06; B60C 7/102; B60C 7/20; B60C 9/0057; B60C 9/02; B60C 9/07; B60C 99/00

See application file for complete search history.

(56) References Cited

U.S. PATENT DOCUMENTS

| | | | |
|---|---|---|---|
| 9,895,943 B2 | 2/2018 | Bill | |
| 10,183,534 B2 | 1/2019 | Bill | |
| 10,449,812 B2 | 10/2019 | Smith et al. | |
| 10,596,867 B2 | 3/2020 | Bill | |
| 10,759,234 B2* | 9/2020 | Shoyama ................ B64C 25/36 | |
| 2015/0224831 A1 | 8/2015 | Miller | |
| 2017/0087943 A1 | 3/2017 | Bill | |
| 2017/0096037 A1 | 4/2017 | Smith et al. | |
| 2019/0184772 A1 | 6/2019 | Bill et al. | |
| 2020/0277086 A1 | 9/2020 | Arnoux et al. | |
| 2022/0134812 A1* | 5/2022 | Bill .................... B60C 23/0477 701/32.7 | |
| 2022/0134813 A1* | 5/2022 | Bill ........................ G07C 5/085 701/29.6 | |
| 2022/0134815 A1* | 5/2022 | Bill .................... B60C 23/0474 701/31.7 | |
| 2022/0185039 A1* | 6/2022 | Puntambekar ...... B60C 23/0479 | |

FOREIGN PATENT DOCUMENTS

| | | |
|---|---|---|
| EP | 3 118 030 | 1/2017 |
| GB | 2536497 | 9/2016 |
| GB | 2540414 | 1/2017 |
| WO | 20015/110780 | 11/2005 |

OTHER PUBLICATIONS

Combined Search and Examination Report for GB Application No. 2019447.8, dated Apr. 28, 2021, 8 pages.

\* cited by examiner

APPARATUS AND METHOD FOR DETERMINING AIRCRAFT TIRE PRESSURE

RELATED APPLICATION

This application claims priority to and entirely incorporates by reference United Kingdom patent application GB 2019447-8 filed Dec. 10, 2020.

TECHNICAL FIELD

The present invention relates to determining tire gas pressure of aircraft tires.

BACKGROUND

Monitoring of tire inflation pressures is an important part of aircraft maintenance. An underinflated tire is more likely to burst during take-off and/or landing and a tire burst can cause significant damage to surrounding aircraft structures. Tire pressure checks are therefore mandated to be carried out at regular intervals for commercial aircraft.

Current methods of tire pressure checking include manual methods (using a pressure gauge to measure each individual tire manually) and automated methods (interrogating pressure sensors attached to each wheel to measure the associated tire pressure).

In order to give a reliable result, tire pressure should be measured when the gas in the tire is at a steady state. Landing increases the heat in the tire and the brakes, raising the temperature of the gas. For an accurate measurement, the tire gas pressure should be measured when the tire is at a steady state. It can take a long time for the gas in the tire to reach a steady state because it is subject to heating from nearby brake system components, such as brake discs, radiating heat while they cool even though the aircraft is standing. Airbus therefore require waiting at least three hours with the aircraft standing before carrying out a tire pressure measurement.

This three-hour requirement can impose significant operational constraints, especially when turnaround is short, so the opportunity to take a tire pressure measurement may be restricted. For example, it may only be possible when the aircraft is not in use overnight and has stood for the required amount of time. Some aircraft operating on long haul routes may be in flight overnight and typically have a turnaround time of less than three hours, making the required three hour wait difficult to schedule.

It would be desirable to improve aircraft tire maintenance and/or pressure measurement.

SUMMARY

According to a first aspect, there is provided an apparatus for determining tire pressure of an aircraft tire. The apparatus comprises a processing system configured to: obtain a first set and a second set of tire measurement data for an aircraft, wherein the first set is from a start of a flight cycle and the second set is from a time before the first set; and determine a steady state tire pressure based on the first and second sets of measurement data.

Automated pressure sensing devices have allowed data to be collected on the behaviour of aircraft tires in a way not previously available. Data can be gathered automatically at many different points in the daily operation of an aircraft. One insight from such data is that the gas pressure of an aircraft tire decreases towards a steady state in a predictable manner, so that the steady state can be predicted even if it has not yet been reached. This can enable a steady state tire pressure to be determined without having to wait three hours. In addition to the operational benefits, this also allows steady state pressures to be determined more frequently than the mandated check interval, for example more frequently than once every three days, giving safety benefits. By using a first set of data from a start of a flight cycle one of the data points is as long as possible after touchdown and so will be the closest to the steady state. When this is combined with data from an earlier time the steady state value can be determined from the pressure trend. Furthermore, the first set of data will usually have the lowest temperature data because it allows maximum cooling as a base measurement.

A start of flight cycle may be a time of initial movement of the aircraft after boarding is complete, for example a point of dispatch from a gate at an airport. The start of a flight cycle may be time at which an aircraft first starts moving from stationary on departure from an airport. At many airports this can be a physical push back.

The data set can include data for all tires of the aircraft or a subset of less than all, including a single tire. Including data for all tires allows a single apparatus to determine the tire pressure for all the tires on an aircraft and provide a single report.

The apparatus can take several forms, including: an avionics system, flight computer or cockpit system in an aircraft; a maintenance system or server; and a handheld device, such as a handheld computing device.

Optionally, the processing system is further configured to: compare the tire pressure to a threshold; and provide an alert based on the comparison. Such a comparison and alert can increase safety and prompt maintenance of the tire when action is required, such as reinflation. The threshold may be a reinflation threshold, indicating a pressure below which a tire should be reinflated. The threshold may also be a replacement threshold, indicating a pressure below which a tire should be replaced. In some examples, the threshold is dependent on the wheel position, for example it may be different for Nose Landing Gear compared to Main Landing Gear reflected the different recommended inflation pressures between those positions. The alert can be a visual, audio, or haptic alert and/or combinations. For example, a visual warning may be provided in the aircraft cockpit and/or on a display of a maintenance apparatus.

Optionally, the processing system is further configured to: determine a steady-state pressure trend over time, and provide an alert based on the pressure trend. For example, the steady-state pressure may be determined at the start of flight and a pressure trend determined, if the pressure trends indicates that reinflation will be required in the future an alert can be provided. The alert might warn that reinflation will be required in a particular time frame, such as within two days, three days, five days or 10 days.

Optionally, the second set of measurement data is from a time between 10 and 30 minutes before the first set of measurement data. This improves the accuracy of the determined steady state pressure: the second set of measurement data is relatively close to the first measurement data in time, so that error from predicting the path between the first and second sets of data is reduced, but also far enough away in time that a difference in pressure can be measured, reducing another potential source of error.

Optionally, the processing system is configured to determine the steady state tire pressure based on an exponential decay with a predetermined time constant. For example, the pre-determined time constant can characterise one or both of a particular tire type and wheel (such as a wheel position). A tire type can be one or more of tire manufacturer, tire model, tire rating, and tire construction. The time constant may additionally or alternatively be predetermined using past data from aircraft including flight data from one more of a particular geographic region (e.g. data collected in a particular country or area), a particular aircraft operator, a particular maintenance provider, a particular aircraft manufacturer, and a particular aircraft model. This can allow a more accurate determination of the steady-state pressure because the time constant is based on data specific to particular operational factors. As automated tire monitoring systems become more commonplace, the required past data can be gathered relatively quickly from normal flight operations. Test data may also be used.

Some examples may include a learning or calibration period during which sufficient data is gathered to allow a reliable predetermined time constant to be determined. In some cases the characteristic may be specific to a particular aircraft and derived from data recorded in use on that aircraft.

Optionally, the measurement data includes temperature data, and the processing system is configured to determine the steady state pressure by adjusting for ambient temperature. This allows comparison between measurements at different steady state temperatures. Steady state temperature varies with ambient temperature and weather. The tire gas pressure is proportional to temperature, so a more accurate comparison can be made by expressing the steady state temperature at ambient temperature. In some cases, the steady state pressure may then further be adjusted to be expressed at a reference temperature to allow comparison between results at different ambient temperatures. Any suitable reference temperature can be used, for example 15° C. or 20° C.

Optionally, the measurement data includes a gross aircraft weight, and the processing system is configured to determine the steady state pressure by adjusting for the gross aircraft weight. Loading can account for as much as a 4% variation in steady state pressure, which can be significant when a reinflation threshold is, for example 95% of the recommended steady state pressure. Gross aircraft weight may be estimated and/or determined in several ways including: by assuming a standard weight for cargo and each person on board and their baggage; by a hybrid method, such as knowing combined baggage and cargo weight by weighing it before loading and assuming a standard weight for each person; and by measurement using sensors on the aircraft, for example through strain gauges at points of load transfer to the undercarriage.

Optionally, the measurement data may further comprise the pressure altitude and the processing system is configured to determine steady state pressure by adjusting for the pressure altitude. This improves the accuracy of the steady state pressure; pressure at low lying airports is higher than pressure at higher airports because of the change in altitude.

According to a second aspect, there is provided a method of determining tire pressure of an aircraft tire. The method comprises obtaining a first set and a second set of tire measurement data for an aircraft, wherein the first set is from a start of a flight cycle and the second set is from a time before the first set; and determining a steady state tire pressure based on the first and second sets of measurement data.

According to a third aspect, there is provided an aircraft maintenance system comprising a communication interface and a processor. The communication interface is configured to obtain a first set and a second set of tire measurement data for an aircraft, wherein the first set is from a time of dispatch of an aircraft and the second set is from a time between 10 and 30 minutes before the first set. The processor configured to determine a steady state tire pressure based on the first and second sets of measurement data using an exponential relationship.

Any of the features of the first aspect can equally be applied to the second and third aspects.

BRIEF DESCRIPTION OF THE DRAWINGS

Embodiments of the invention will now be described, by way of example only, with reference to the accompanying drawings, in which.

DETAILED DESCRIPTION

Figure 1:
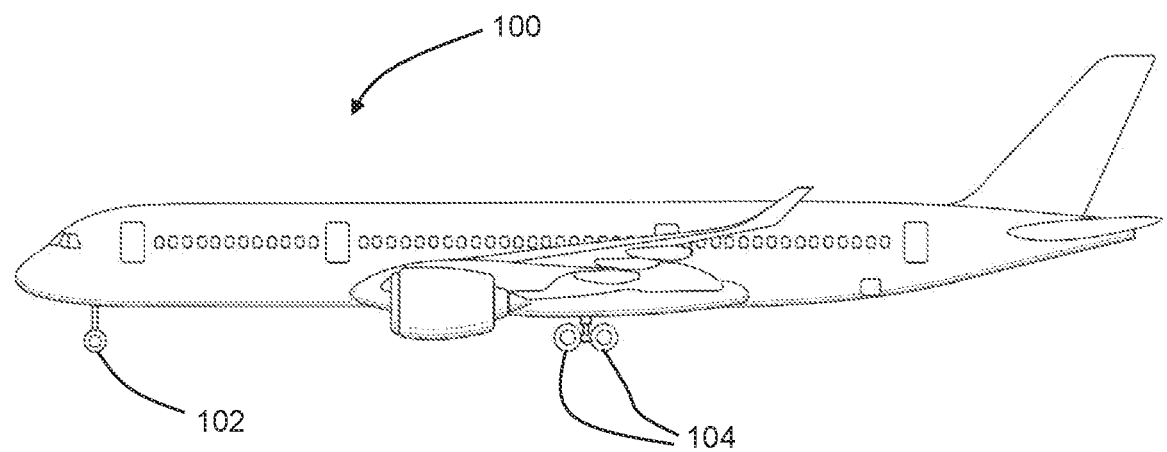
FIG. 1 shows a schematic view of an aircraft with which embodiments can be practiced.

FIG. 1 depicts an aircraft in which embodiments of the invention may be practiced. The aircraft 100 includes nose landing gear with tires 102 and main landing gear with tires 104. During use and operation of the aircraft it is important that the tires 102, 104 remain inflated to the correct pressure. Incorrectly inflated tires can burst unexpectedly, leading to potential safety issues. As will be explained in more detail below, embodiments of the invention receive data on the measured tire pressure and calculate a current steady state pressure which may be corrected for various factors to improve accuracy. Once the steady state tire pressure is determined, it can be compared to acceptable limits and thresholds, with maintenance actions, such as reinflation, scheduled as needed. FIG. 1 depicts an aircraft with twin aisles, in this case an Airbus A350. It will be appreciated that the invention can be applied to any aircraft.

Each tire 102, 104 is provided with a tire monitoring device. The tire monitoring device records pressure and an associated temperature at various times. For example, the tire monitoring device may generate and save the data at regular intervals, or at defined specific events such as touchdown. In some examples, the tire monitoring device only measures the pressure.

The aircraft 100 may also include other systems which provide sensor data in addition to the tire monitoring devices. While much of this is used for flight control purposes, some data can also be useful for determining steady-state tire pressure, such as sensor data for measuring aircraft loading. Data from all sensors in the aircraft may be aggregated into a single data system that can provides reports of sensor status at regular intervals or when particular events occur. Alternatively, or additionally, the sensors in the tires may be interrogated separately from other aircraft systems. More detail of the systems which can receive the sensor data and use it to determine tire pressure will now be described with reference to FIGS. 2 to 4.

Figure 2:
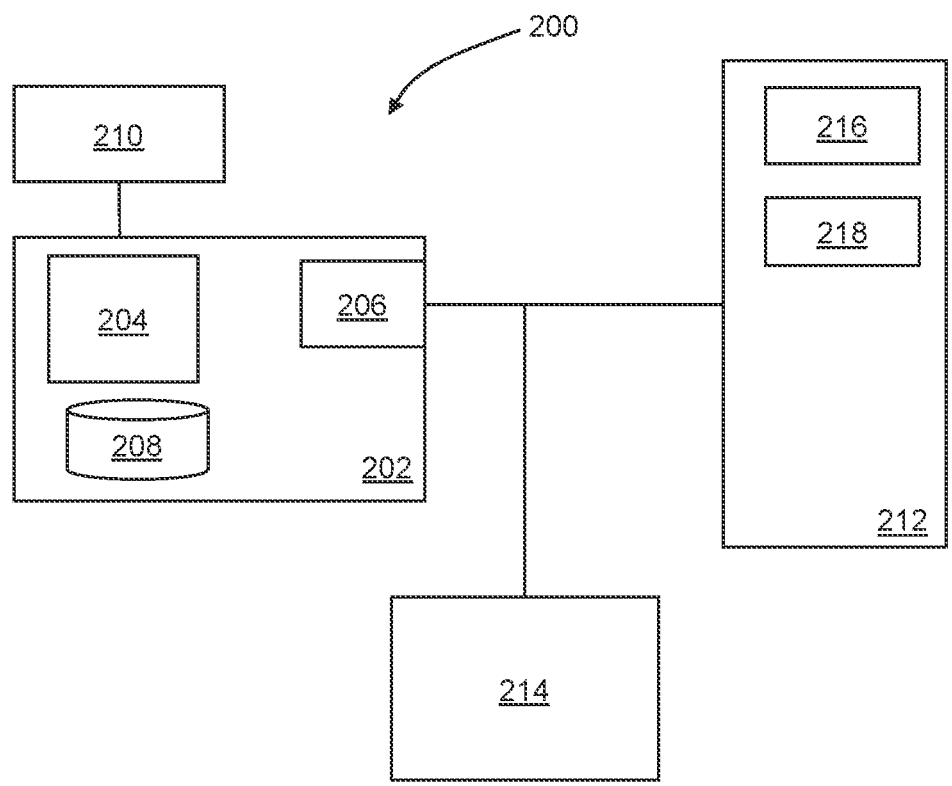
FIG. 2 shows a schematic view of an aircraft cockpit information system including a tire pressure sensor.

FIG. 2 depicts an aircraft tire monitoring system 200. The system comprises a cockpit system 202, which comprises a processor 204, a communication interface 206 and a storage 208. The processor 204 can be any suitable processor, including single or multi-core processors, processing systems, and so on. Storage 208 is a solid state drive or hard drive which can store both computer program instructions for execution by the processor 204 and data received from the sensor systems throughout the aircraft. The communication interface 206 is a wired communication interface connected via a data network to sensors throughout the aircraft. Cockpit system 202 is also connected to a display 210 located in the cockpit. Via the display 210, the cockpit system 202 can display information and/or warnings.

The communication interface 206 receives data from sensors located throughout the aircraft. This includes tire monitoring devices 212 and other sensors, such as load sensor 214. For clarity only a single tire monitoring device 212 and load sensor 214 is depicted. It will be appreciated that there may be more than one of these items, for example each tire of the aircraft will usually have an associated tire monitoring device 212.

The tire monitoring device 212 includes a temperature sensor 216 and a gas pressure sensor 218. The gas pressure sensor 218 is configured to measure the gas pressure within the tire. The temperature sensor 216 is not in direct contact with the gas in the tire so measures a temperature indicative of the gas temperature, rather than the actual gas temperature. For example, the temperature 216 may be used to provide data of the ambient temperature in the vicinity of the tire. Some examples may omit the temperature sensor 216.

Tire gas pressure is proportional to the gas temperature, but as the gas temperature is not measured directly, it is difficult to convert a measured gas pressure to a pressure at a known reference temperature. This makes it difficult to compare the measured pressure against an expected reference pressure for safe operation. As a result, it is currently mandated that an aircraft must stand for three hours to allow the tire, wheel and brake systems to reach a steady state where the effect of heat from landing are reduced. As will be explained in more detail below, embodiments of the present invention apply novel techniques to analyse data from tire pressure sensors so that the likely tire pressure at steady state can be determined without having to wait for three hours.

The cockpit system 202 can obtain information from the sensors directly via communication interface 206 and/or retrieve historical data from storage 208. The processor 204 may then process this data to determine a tire pressure at steady state. Once this is known, it can be compared to safety thresholds, with a warning provided via the display 210 if a threshold has been exceeded.

The cockpit system 202 can provide a variety of warnings or indications depending on the measured steady state temperature. For example, reinflation of a tire may be recommended once tire gas pressure has fallen to below 95% of a recommended inflation pressure. If the tire gas pressure has fallen below 90% of the recommended inflation pressure, then replacement of the tire may be indicated. In this way, the cockpit information system can indicate urgent maintenance requirements which may affect safety to the pilot.

In some cases, the cockpit system may also analyse historical trends. For example, the rate of change in the steady state tire pressure over time might be determined. Using the methods described herein, the steady state pressure can be determined without having to wait for three hours, so it can potentially be determined for every flight cycle. An information, warning or alert may be given via the display if the steady state pressure trend suggests that the time pressure will fall below one of the thresholds in the future. For example, the tire pressure trend may indicate that although the current measured tire pressure is acceptable, it will fall below 95% in two days, so that the tire should be reinflated within the next two days.

Figure 3:
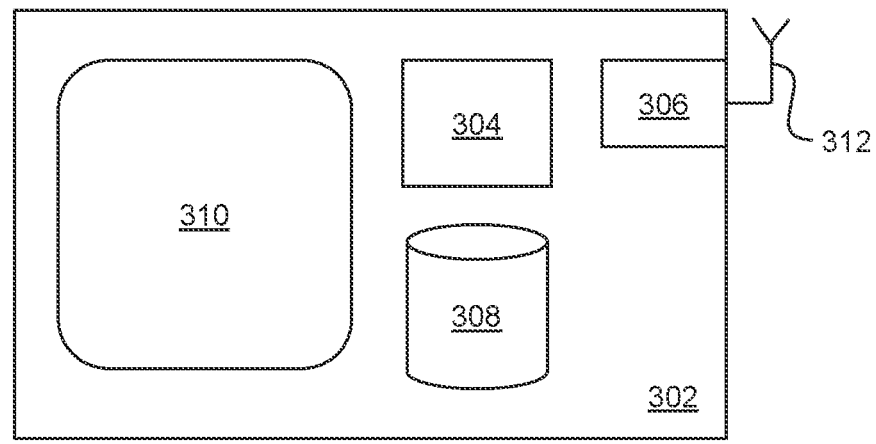
FIG. 3 shows a schematic view of a handheld device interfacing with a tire pressure sensor.

In the system 200 of FIG. 2, the processing and warnings are carried using a cockpit system 202. This is convenient for providing warnings to the pilots, but is less convenient for maintenance crew. For example, maintenance crew are less likely to be inside the cockpit to receive the information or warnings on the display. In the embodiment of FIG. 3, a handheld device 302 replaces the cockpit system 202. The handheld device 302 may be a portable computing device, such as a smart phone, tablet or laptop computer and comprises a communication interface 304, which is a wireless communication interface having an antenna 312 in this case, and a processor 306 coming together with storage 308 in a similar way to the cockpit information system 202. However, because the handheld device is more portable, it can be carried to a location where maintenance is required. The handheld device is not permanently connected to the sensor systems within the aircraft. It may obtain the sensor data by directly querying the sensors themselves, such as directly querying tire monitoring devices which themselves store a history of measurement data. Alternatively, or additionally, the handheld device may also query the cockpit system 202 to receive sensor data.

Once the handheld device has received the data, it can process it in much the same way as the cockpit system 202 described above. For example, the hand held device can provide warnings on a display 310 of the hand held device.

Figure 4:
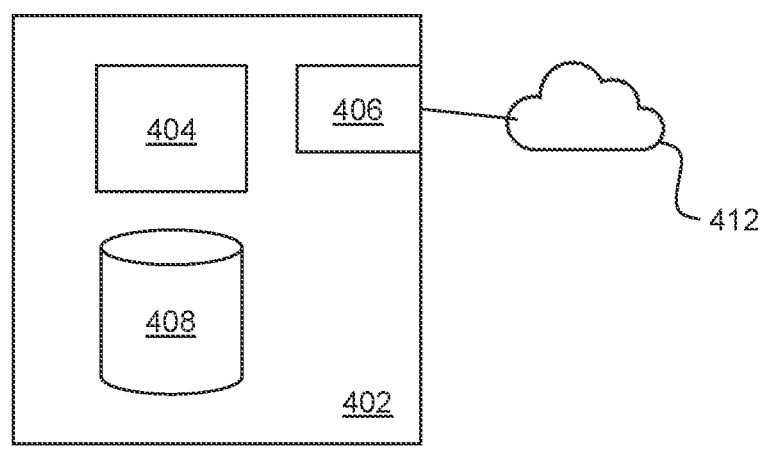
FIG. 4 shows a maintenance system interfacing with a tire pressure sensor.

Both the cockpit system 202 and the handheld device 302 operate in the vicinity of the aircraft. In the embodiment of FIG. 4 a remote maintenance system 402, in this case a remote maintenance server, replaces the cockpit system 202. Rather than being located in the vicinity of the aircraft, the maintenance server 402 is remote from the aircraft. Similar to the cockpit system it comprises a processing system 404, a communication interface 406, and a storage 408. The maintenance system 402 receives sensor data via the communication interface 406, for example data may be uploaded from an aircraft when aircraft maintenance is carried out via the internet 412, perhaps by relaying via the hand held device 302 of the embodiment of FIG. 3. The maintenance system 402 may also receive data from the aircraft, for example a wireless data connection for telemetry. Such a telemetry connection can send sensor data at regular intervals regardless of whether maintenance is carried out.

Maintenance server 402 can provide alerts and indications in various ways. For example, information may be provided to a service center operative via a web page or email system. Maintenance server 402 may also use the received sensor data to schedule maintenance actions based on the sensor data, such as tire reinflation or replacement.

Figure 5:
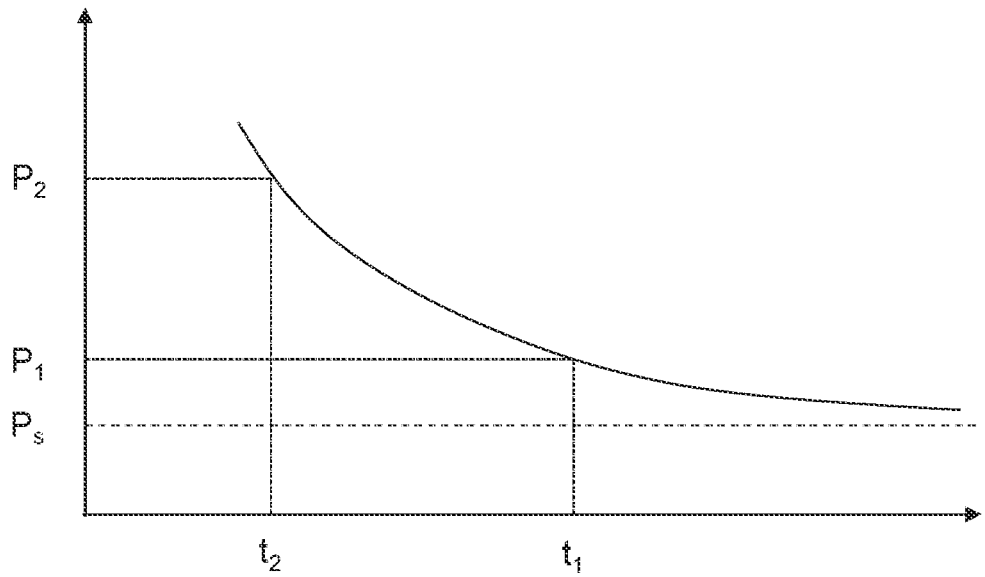
FIG. 5 is a graph of an exponential decrease towards steady-state.

A method will now be described, with reference to FIG. 5, by which an apparatus, such as the cockpit system, handheld device, or maintenance server described above can establish the steady state pressure without having to wait 3 hours for the system to reach a steady state.

From analysis of data collected by tire monitoring devices, it has been observed that as the tires of an aircraft cool towards steady state they follow an exponential path. This exponential relationship can be characterised based on past data, so that the steady state pressure can be determined simply by measuring the pressure at two points in time using the relationship:

$$P_s = \frac{P_1 - P_2 e^{-k(t_1-t_2)}}{1 - e^{-k(t_1-t_2)}}$$

where $P_s$ is the steady state pressure, $P_1$ is the measured gas pressure at a time $t_1$, $P_2$ is a measured gas pressure at a time $t_2$, and k is a constant determined from past data. Time $t_1$ is later than time $t_2$ and is close to the end of a period when the aircraft has been stationary. For example, $t_1$ may correspond to a point of dispatch or a point of push back from a gate at an airport. In this way, more accurate steady state pressures are determined because this point is closer to the steady state pressure. Time $t_2$ is, for example 15 to 30 minutes before time $t_2$. These points are shown graphically in FIG. 5.

Constant k can be determined from historical flight data using in-service or test flights. With an automated tire monitoring device, the tire gas pressure can be measured at various points in time and the steady-state observed from the data. Using knowledge of the final steady state pressure and the pressure at two times, $t_1$ and $t_2$, again with reference to FIG. 5, so that $t_1$ is after $t_2$, the constant k can be calculated as follows:

$$k = \frac{\ln((P_1 - P_S)/(P_2 - P_S))}{t_2 - t_1}$$

The constant k will typically be specific to at least an aircraft model, but in some examples it can be more specific to a particular tire and wheel system. A library of values of k may be built up for use across a fleet of aircraft. For example, the library may have a reference value of k for a particular tire model (brand or part number), potentially at a particular wheel position. In another example, k may be calculated for each specific tire by first recording pressure data leading to a steady state, for example when an aircraft is resting overnight.

In this way, the steady state pressure can be calculated without needing to wait for the steady state to be reached. It is therefore possible to measure steady state tire pressures in a much shorter period than before. As another benefit, it means that it is possible to gather a steady state tire pressure for each flight cycle, enabling trends and other information to be established which are not possible with existing manual measurements taken once every three days.

Figure 6:
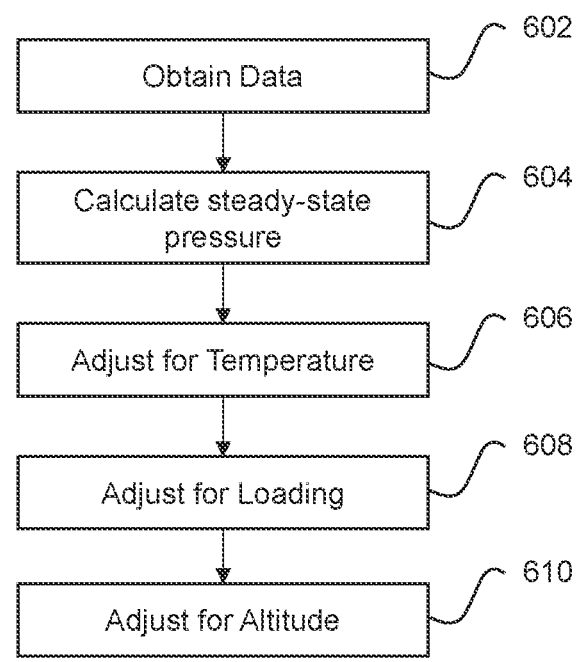
FIG. 6 is a flow chart of a method for determining a steady state tire pressure.

FIG. 6 depicts an example method by which steady state tire pressure can be calculated according to an embodiment. In the method of FIG. 6, the steady state pressure calculated from the exponential curve using constant k is further adjusted for other factors so that it more accurately represents the underlying steady state tire pressure.

First, at block 602, sensor data is obtained or received for times $t_1$ and $t_2$. For example, the data can be obtained by querying data storage for sensor data or by querying tire monitoring devices directly, if those also store the tire pressure data.

Next, at block 604, the steady state pressure is calculated using the data retrieved and knowledge of the predetermined constant k. This gives an initial steady state reading $P_S$ which is improved in accuracy in the following steps.

At block 606, the steady state pressure is adjusted for ambient temperature. The ambient temperature changes the tire gas pressure because, as temperatures increase, so gas pressure increases from the application of the ideal gas law. It is common to express desired tire gas pressures at a reference temperature, such as 15° C. or 20° C. In this block, the pressure is adjusted by multiplying by factor 1, where:

$$\text{Factor } 1 = \frac{T_1}{288}$$

and $T_1$ is the ambient temperature in Kelvin at time $t_1$. The denominator is determined based on the reference temperature in Kelvin. In the equation above, the reference temperature is 15° C. or 288 K. Ambient temperature may be determined from a sensor. In some cases, this can be a temperature sensor on the aircraft in general, in the tire monitoring device (although this might be influenced by heating effects from landing) or from weather data for the airport.

At block 608, the steady state pressure is further adjusted for aircraft loading by multiplying by a factor 2. Aircraft loading can impact the tire pressure by providing a greater weight and therefore the tire pressure increases to support that weight.

$$\text{Factor } 2 = 0.96 + 0.04 \frac{GW}{MTOW}$$

Where GW is the gross weight of the aircraft at time $t_1$ and MTOW is the maximum authorised gross weight of the aircraft. GW may be sensed directly or obtained from elsewhere, for example determined from data of the aircraft empty weight, plus fuel, passengers and luggage. Such data can be obtained from an aircraft's flight management computer in some examples.

Finally, at block 610, the steady state pressure is adjusted by multiplying by a third factor, factor 3, which accounts for differences in pressure altitude. Altitude also influences gas pressure in tires, with higher altitude corresponding to a lower gas pressure in the tire:

$$\text{Factor } 3 = e^{-0.00012h}$$

where h is the pressure altitude (in meters) of the aircraft at time $t_1$.

Applying all three corrective factors improves the accuracy of the steady state pressure. By determining the steady state pressure after each flight, or at regular intervals, such as at least once a day, pressure trends may be determined and maintenance actions indicated.

If the steady state pressure is underneath an absolute threshold for safety, such as when reinflation is required or when replacement is required, an immediate alert may be given. For example, the method is most accurate when measured at the point of push back or dispatch. At this point, an aircraft is about to enter a flight cycle. If the calculated steady state pressure is low and action is required, then a cockpit system may provide a warning or alert to a pilot so that remedial action can be taken immediately. Alternatively, or additionally, when trends in tire pressure indicate remedial action is required, or suggest that it will be required in the future, a maintenance system can take action to schedule that the required remedial action, without requiring the immediate notification within a cockpit.

It will be appreciated that while accuracy is improved by adjusting for all three factors, other embodiments may apply one or more of the additional factors, or none. Similarly, although FIG. 6 shows the factors being applied in a particular order, other embodiments may apply the factors in different orders.

Where methods have been described, these may be implemented by a computer program. A computer-readable medium may store instructions that, when executed by a processing system, instruct the processing system to perform the method. The computer-readable medium may be a non-transitory computer-readable medium.

It is to be noted that the term "or" as used herein is to be interpreted to mean "and/or", unless expressly stated otherwise.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An apparatus for determining tire pressure of an aircraft tire, the apparatus comprising a processing system configured to:
   obtain a first set of tire pressure measurement data and a second set of tire measurement data both for an aircraft, wherein the first set is from a start of a flight cycle and the second set is from a time before the first set; and
   determine a steady state tire pressure based on the first and second sets of measurement data.

2. The apparatus of claim 1, wherein the processing system is further configured to:
   compare the steady state tire pressure to a threshold; and
   provide an alert based on the comparison.

3. The apparatus of claim 1, wherein the processing system is further configured to:
   determine a trend in the steady-state tie pressure trend over time; and
   provide an alert based on the trend.

4. The apparatus of claim 1, wherein the second set of tire pressure measurement data is from a time in a range of 10 to 30 minutes before the first set of tire pressure measurement data.

5. The apparatus of claim 1, wherein the processing system is configured to determine the steady state tire pressure based on an exponential decay with a predetermined time constant.

6. The apparatus of claim 1, wherein the measurement data includes temperature data, and the processing system is configured to determine the steady state tire pressure by adjusting for ambient temperature.

7. The apparatus of claim 1, wherein the first and second sets of tire pressure measurement data includes data indicating a gross aircraft weight, and the processing system is configured to determine the steady state tire pressure by adjusting for the gross aircraft weight.

8. The apparatus of claim 1, wherein the first and second tire pressure measurement data further comprises data indicating a pressure altitude and the processing system is configured to determine steady state pressure by adjusting for the pressure altitude.

9. A method of determining tire pressure of an aircraft tire, the method comprising:
   obtaining a first set of tire pressure measurement data and a second set of tire measurement data both for an aircraft, wherein the first set is from a start of a flight cycle and the second set is from a time before the first set; and
   determining a steady state tire pressure based on the first and second sets of tire measurement data.

10. The method of claim 9, comprising:
    comparing the steady state tire pressure to a threshold; and
    providing an alert based on the comparison.

11. The method of claim 9, comprising:
    determining a trend in the steady-state tire pressure trend over time; and
    providing an alert based on the trend.

12. The method of claim 9, wherein the second set of tire pressure measurement data is from a time in a range of 10 to 30 minutes before the first set of tire pressure measurement data.

13. The method of claim 9, comprising determining the steady state tire pressure based on an exponential decay with a predetermined time constant.

14. The method of claim 9, wherein the first set and second set of tire pressure measurement data includes data indicating temperature, and the processing system is configured to determine the steady state tire pressure by adjusting for ambient temperature.

15. The method of claim 9, wherein the first set and second set of tire pressure measurement data includes data indicating a gross aircraft weight, and the processing system is configured to determine the steady state tire pressure by adjusting for the gross aircraft weight.

16. The method of claim 9, wherein the first set and second set of tire pressure the measurement data further comprises data indicating a pressure altitude, and the processing system is configured to determine the steady state tire pressure by adjusting for the pressure altitude.

17. An aircraft maintenance system comprising:
    a communication interface configured to obtain a first set of tire pressure measurement data and a second set of tire measurement data both for an aircraft, wherein the first set is from a dispatch of an aircraft and the second set is from a time in a range of 10 to 30 minutes before the first set; and
    a processor configured to determine a steady state tire pressure based on the first and second sets of the tire pressure measurement data using an exponential relationship.

* * * * *